United States Patent
Simonian et al.

(10) Patent No.: US 12,526,900 B1
(45) Date of Patent: Jan. 13, 2026

(54) IDENTIFYING, RECORDING, ENCODING, AND REPRODUCING ELECTROMAGNETIC RADIATION

(71) Applicant: Telelumen, LLC, Mountain View, CA (US)

(72) Inventors: Dmitri Simonian, Mountain View, CA (US); Steven Paolini, Camarillo, CA (US); Ross Archer, San Jose, CA (US)

(73) Assignee: Telelumen, LLC, Sunnyvale, CA (US)

( * ) Notice: Subject to any disclaimer, the term of this patent is extended or adjusted under 35 U.S.C. 154(b) by 0 days.

(21) Appl. No.: 19/020,713

(22) Filed: Jan. 14, 2025

(51) Int. Cl.
*H05B 47/165* (2020.01)
*H05B 45/10* (2020.01)

(52) U.S. Cl.
CPC ........... *H05B 47/165* (2020.01); *H05B 45/10* (2020.01)

(58) Field of Classification Search
CPC ......... G06T 2207/20081; G06T 15/506; G06T 2207/30041; G06N 20/00; G06N 5/04; G06N 3/08; G06N 3/0985; H05B 47/105; H05B 45/10; H05B 45/20; H05B 47/11; H05B 47/175; H05B 47/115
See application file for complete search history.

(56) References Cited

U.S. PATENT DOCUMENTS

| | | | |
|---|---|---|---|
| 8,021,021 B2 | 9/2011 | Paolini | |
| 8,469,547 B2 | 6/2013 | Paolini | |
| 8,922,570 B2 | 12/2014 | Archer | |
| 9,028,094 B2 | 5/2015 | Paolini | |
| 9,345,117 B2 | 5/2016 | Archer | |
| 9,534,956 B2 | 1/2017 | Paolini | |
| 9,572,231 B2 | 2/2017 | Simonian et al. | |
| 9,574,747 B2 | 2/2017 | Paolini | |
| 9,635,728 B2 | 4/2017 | Simonian et al. | |
| 9,820,360 B2 | 11/2017 | Paolini | |
| 9,888,539 B2 | 2/2018 | Paolini | |
| 9,974,141 B2 | 5/2018 | Simonian et al. | |
| 10,045,417 B2 | 8/2018 | Simonian et al. | |
| 10,172,204 B2 | 1/2019 | Paolini | |
| 10,433,392 B2 | 10/2019 | Simonian et al. | |
| 2009/0323321 A1 | 12/2009 | Paolini | |
| 2011/0215725 A1 | 9/2011 | Paolini | |
| 2012/0229048 A1 | 9/2012 | Archer | |
| 2013/0268383 A1 | 10/2013 | Paolini | |
| 2013/0307419 A1 | 11/2013 | Simonian et al. | |
| 2015/0123564 A1 | 5/2015 | Simonian et al. | |
| 2015/0189719 A1 | 7/2015 | Archer | |

(Continued)

*Primary Examiner* — Monica C King
(74) *Attorney, Agent, or Firm* — Ascenda Law Group, PC

(57) ABSTRACT

A method for identifying, recording, encoding, or reproducing electromagnetic radiation employs machine learning models. For example, each of multiple training illuminations may be measured using first and second types of systems. The first type of system may be a low-cost system that includes light sensors and measures an array of readings; the second type of system may be a precision spectrometer that measures the spectral power distribution. A trained machine learning model may predict the spectral power distribution of illumination from the array associated with the first type of system and may predict the representation of illumination understood by a spectrally tunable luminaire. The array of readings associated with the first type of system may be used to identify, record, encode, or reproduce electromagnetic radiation.

13 Claims, 5 Drawing Sheets

(56) References Cited

U.S. PATENT DOCUMENTS

| | | |
|---|---|---|
| 2015/0211925 A1 | 7/2015 | Paolini |
| 2015/0354789 A1 | 12/2015 | Paolini |
| 2016/0192454 A1 | 6/2016 | Simonian et al. |
| 2016/0255695 A1 | 9/2016 | Archer |
| 2017/0094741 A1 | 3/2017 | Paolini |
| 2017/0116778 A1* | 4/2017 | Lee .................. G06T 7/536 |
| 2017/0142803 A1 | 5/2017 | Simonian et al. |
| 2017/0142809 A1 | 5/2017 | Paolini |
| 2017/0159912 A1 | 6/2017 | Paolini |
| 2017/0181252 A1* | 6/2017 | Wouhaybi ............ H05B 47/115 |
| 2017/0257925 A1* | 9/2017 | Forbis ................ F21V 29/74 |
| 2018/0070433 A1 | 3/2018 | Paolini |
| 2018/0270928 A1 | 9/2018 | Simonian et al. |
| 2020/0058401 A1* | 2/2020 | Harrison ............. G06T 15/506 |
| 2020/0060007 A1* | 2/2020 | Harrison ............. H04N 23/90 |

\* cited by examiner ns/ of an exemplary machine learning model in accordance with an embodiment of the present disclosure.

IDENTIFYING, RECORDING, ENCODING, AND REPRODUCING ELECTROMAGNETIC RADIATION

BACKGROUND OF THE INVENTION

Some advanced lighting systems can control the intensity and the spectral distribution of the illumination in an environment. These systems may be programmable to reproduce or simulate illumination from many different sources or many different environments. For example, a lighting system may be programmed to light an environment with illumination that simulates sunlight or moon light at a specific location and time during specific weather or atmospheric conditions and may subsequently be reprogrammed to simulate any other desired lighting of the environment. Given measured or inferred data and appropriate hardware, such systems could be used as a laboratory tool to simulate and explore difficult hypothetical scenarios, including plant or human biological responses to being on the surface of different bodies in orbit around our sun, on another planet, or around a distant star for which spectral data is known. Additionally, such systems could simulate time variance in the lighting given actual, simulated, or environmental data. Such advanced lighting systems generally need programming or data that identifies the illumination to be simulated or produced.

A spectral power distribution may need to be measured or identified, for example, to generate programming or data for a programmable lighting system. A spectrometer may measure the spectral power distribution of ambient illumination, i.e., the light illuminating an area or environment. A spectrometer when measuring illumination may, for example, measure the intensity of light in hundreds of wavelengths bands. At present, widespread adoption of spectrometers in consumer applications is problematic because spectrometers are expensive, can be complex and cumbersome to set up and use, and may not be readily available to the average consumer. However, consumers often have devices such as smartphones or cameras to capture images and video. Presently, these smartphones or cameras are limited to separately measuring a few wavelength bands, usually red, green, and blue light, which together identify a color seen by the typical human eye. Measurements of a few wavelength bands are, however, insufficient to determine an arbitrary spectral power distribution. For example, different illuminations that have the same color or chromaticity but different spectral distributions may cause illuminated objects and images to look quite different. In particular, an object may have different apparent colors under the different illuminations even if the different illuminations have the same chromaticity. Also, different spectral distributions that have the same color or chromaticity (or even the same spectral content in the visible part of the spectrum) may have different ultraviolet (UV) or infrared (IR) spectra that may cause different effects on humans, plants, and animals.

Another issue is that illumination programming or data may need to be formatted for the specific components of an advanced lighting system. The required form of illumination programming or data may vary widely depending on the hardware in the lighting systems. For example, a lighting system may include multiple luminaires, and the number of luminaires in different lighting systems may differ. Individual luminaires in lighting systems may also vary. For example, one luminaire in a lighting system may have a number of lighting channels, e.g., different types of light emitters with different spectral characteristics, and another luminaire in the lighting system may have a different number of lighting channels or have lighting channels with spectral characteristics that differ from the spectral characteristics of lighting channels in the other luminaire. To produce desired illumination, each luminaire in a lighting system may need illumination data that is adapted for the characteristics of the luminaire, but compiling and distributing luminaire-specific illumination data from a spectral distribution or from a standardized representation of illumination may be complex and time consuming.

For the above reasons, systems and methods for measuring, identifying, or encoding illumination or other electromagnetic radiation and for distributing information throughout a lighting system are needed.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Figure 1:
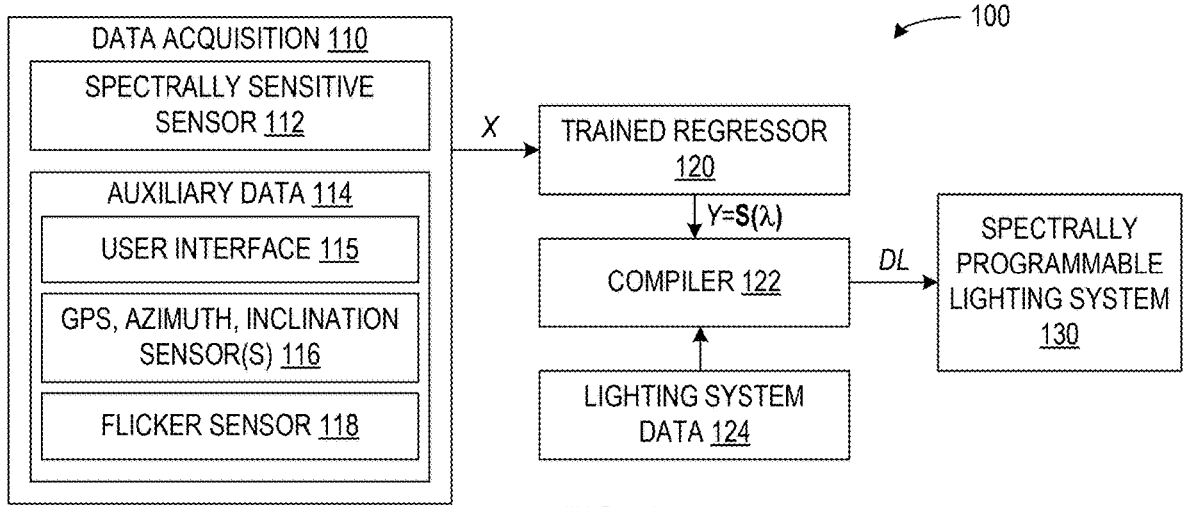
FIG. 1 is a block diagram of a system in accordance with an embodiment of the present disclosure for measuring, identifying, and encoding illumination for use in a spectrally programmable light source.

In accordance with an aspect of the present disclosure, systems and methods may employ a multi-channel spectrally sensitive sensor to measure and record a "lossy" or incomplete representation of an electromagnetic event such as illumination of an environment, and a machine learning system may use the lossy representation of the illumination to identify a higher resolution representation of the illumination. The higher resolution representation may provide improved performance in the programming of a spectrally programmable lighting system to produce or simulate the electromagnetic event.

A multi-channel spectrally sensitive sensor may measure fewer color or wavelength channels than does a typical spectrometer and may allow portable illumination recording at a low cost and low power consumption. Such a sensor produces a lossy representation of an electromagnetic event in the sense that the sensor may be unable to provide sufficient information to accurately represent an arbitrary spectral power distribution at a medium or high resolution (e.g., with wavelength channel widths less than about 100 nm or less than about 10 nm).

A machine learning system may provide the higher resolution representation of the electromagnetic event because such events are not arbitrary but typically belong to one of several classes. Lighting, for example, often falls into classes such as natural daylight, incandescent, high intensity discharge, fluorescent broadband and narrowband, phosphor-converted LED, or multi-channel LED. Even with the low wavelength resolution or a limited wavelength range of the measurements producing the lossy representation, a machine learning system may be trained to identify a representation of the higher-resolution illumination spectrum that produced the measurements. Alternatively, a machine learning system may be trained to use the lossy representation and identify an encoding of illumination understood by a spectrally programmable lighting system. For example, the machine learning system may provide the encoding in the form of the drive levels of the channels of the spectrally programmable lighting system without identifying the higher-resolution spectrum explicitly.

The machine learning system may use a combination of the limited spectral information of the lossy representation with auxiliary information. The auxiliary information may include measurements from any available sensors such as unfiltered light sensor sensitive to all wavelengths, light sensors having a specially designed responsivity, non-color sensors (e.g., UV, IR), sound, temperature, or humidity sensors, and other additional information that may indicate the time, location (e.g., GPS coordinates), orientation, the inclination and azimuth, or other conditions associated with a spectrally sensitive sensor or an electromagnetic event. The auxiliary information may further include user input regarding the electromagnetic event such as the type of radiated spectrum, compass, and personal observations.

In accordance with an aspect of the present disclosure, temporal light modulation measurements, often referred to herein as "flicker", may provide particularly useful and easy to obtain auxiliary information that augments the limited information obtained from a multi-channel spectrally sensitive sensor. The flicker measurements may be obtained using specialized sensors or a generic device such as a smartphone that includes a camera. A machine learning system may be trained to use lossy spectral measurements combined with flicker or other auxiliary information to identify a spectral power distribution, or a representation of a spectral distribution suitable for reproduction by a spectrally programmable light source. In accordance with an aspect of the present disclosure, flicker may be measured using a spectrally sensitive sensor, e.g., a camera that only measures several wavelength bands. The measurement of flicker may be used to select the illumination class for simulation by the programmable source.

A spectrally programmable lighting system or luminaire as used herein is a system capable of "reproducing", "simulating", "matching", or "approximating" a desired illumination. The terms "reproducing", "simulating", "matching", or "approximating" are used herein to signify the capability of a lighting system to approximate the desired illumination as closely as possible, according to a light replication objective. For example, U.S. Pat. No. 9,635,728, entitled "Method of Light Spectrum Replication," which is hereby incorporated by reference in its entirety, describes systems and methods for simulating illumination and for determining of how close simulated illumination is to an ideal or target illumination to be replicated. A spectrally programmable lighting system may have individually controllable channels that are programmed by setting corresponding "drive levels". Drive levels may be defined in a variety of ways, for example, in terms of dimensionless numbers between 0 and 1, in terms of pulse width modulation or amplitude modulation for each channel, in terms of channel drive currents, in terms of optical power or radiance or another radiometric or photometric quantity characterizing radiation emitted by each channel or received at a reference illuminated location, or a combination of the above.

In accordance with an aspect of the present disclosure, systems and methods may compile and distribute information to a network of luminaires, while keeping the compilation time and computing power required for processing of the information short and independent of the number of luminaires on the network.

Terms such as "electromagnetic event," "radiation", "illumination," "light," and "lighting" are used herein without limitation to include the visible part of the electromagnetic spectrum and may further include other parts of the electromagnetic spectrum, for example, ultraviolet and infrared light. The term "representation" of an illumination or a spectrum refers to an array or data set indicating characteristics that can be measured or calculated for the illumination or spectrum; for example, the spectral power distribution or a photon flux distribution with a specific wavelength step size; chromaticities of a reference sample palette illuminated by the illumination; an array of readings by a reference or standard multi-channel spectral sensor illuminated by the illumination; an array of drive levels that are optimized to simulate the illumination by a reference or standard spectrally programmable light source; or a designation identifying a standard illuminant, e.g. D55, along with the luminous or radiant output level. Terms such as "temporal light modulation" and "flicker" are used herein to signify time-dependent illumination, which may or may not be detectable by a human eye. Terms such as "light sensor" are used herein to signify any device or device component such that an incident light may produce or modify an output signal of the device or device component. An example light sensor may be a photodetector with or without a wavelength filter. Another example of a light sensor is a unit cell or a plurality of unit cells of a CCD or a CMOS array of a spectrometer or a camera.

FIG. 1 is a block diagram of a system 100 including a data acquisition system 110 that generates a data set X for identification of an electromagnetic event such as ambient illumination. Data acquisition system 110 may include a spectrally sensitive sensor 112. Spectrally sensitive sensor 112 may measure electromagnetic radiation at a particular time or during a particular time period associated with the electromagnetic event. In one case, a user may operate data acquisition system 110 with the goal of recording illumination for replication or simulation by a multi-channel, spectrally programmable lighting system 130. For the measurement, a user may orient sensor 112 to receive and measure light from an ambient or diffuse source that the user wishes to simulate using spectrally programmable lighting system 130. For example, a user may point the spectrally sensitive sensor 112 at a diffuse source such as the sky or at a white object such as a screen in an area where the user wishes to record illumination. Alternatively, the spectrally sensitive sensor 112 may be oriented or pointed to measure light from a directional light source such as the sun, the moon, a fire, or an electric light or other manmade source of illumination to be simulated.

Spectrally sensitive sensor 112 may be a sensor that does not provide a sufficient number of spectral channels to indicate a spectral distribution to the accuracy, i.e., spectral resolution, needed for or provided by spectrally programmable lighting system 130. For example, spectrally sensitive sensor 112 may be a color sensor that measures intensity in a relatively small number of wavelength bands, so that measurements from sensor 112 are mathematically insufficient to uniquely determine required outputs from all of the channels of spectrally programmable lighting system 130.

Data acquisition system 110 may further include auxiliary data system 114 including sensors such as GPS (global positioning system), azimuth, or inclination sensors 116. Auxiliary data system 114 may further include a flicker sensor 118, an example of which is described further below. Auxiliary data system 114 may also employ an interface 115 for receiving user input such as a user's characterization of illumination being measured. Interface 115 may provide a user interface that allows the user to select a category, e.g., natural or manmade, to characterize the measured illumination. The data set X may include measurements and data that all available sensors, e.g., spectrally sensitive sensor 112, user interface 115, GPS, azimuth, or inclination sensors 116, and flicker sensor 118, captured at about the same time, or may include time-indexed data from some or all available data sources. The data set X may also include the user input, for example, in the form of the attribution of the measurements to a specific class of electromagnetic event.

In a specific example, data acquisition system 110 may be a portable consumer device, for example, a smartphone, a watch, a tablet, a wearable, or a camera as a spectrally sensitive sensor 112. An app or software module on the portable consumer device may implement user interface 115 and flicker sensor 118, e.g., the app may detect variations in measurements of spectrally sensitive sensor 112 to characterize flicker or may enable user input. Portable consumer devices often also include GPS, azimuth, or inclination sensors 116 that can provide measurements that may be included in the data set X.

A predictor or trained regressor 120 receives data set X from data acquisition system 110 and generates a data set Y that identifies or represents an electromagnetic event such as illumination of an environment. For example, data set Y may represent a spectral power distribution $S(\lambda)$ as radiated power in specific wavelength bins. A compiler 122 may convert data set Y, e.g., the spectral power distribution $S(\lambda)$ that the trained regressor 120 predicted from measurements X, into illumination programming data DL, e.g., an array of channel drive levels for lighting system 130. Compiler 122 may require and use lighting system data 124 and may optimize the illumination programming data DL in order to reproduce or simulate the electromagnetic event that the data acquisition system 110 measured.

Figure 2:
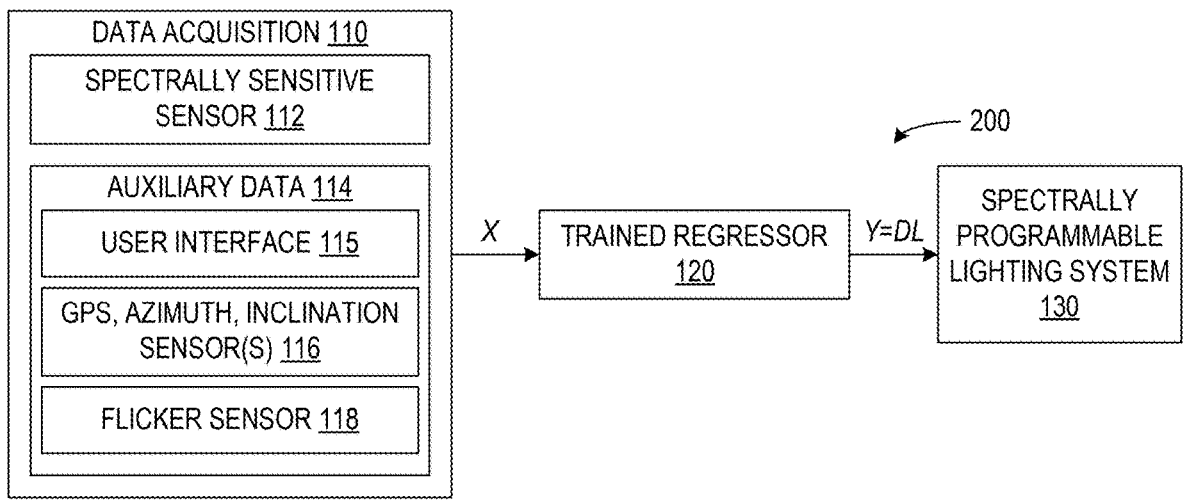
FIG. 2 is a block diagram of a system in accordance with another embodiment of the present disclosure for measuring, identifying, and encoding illumination for use in a spectrally programmable light source.

FIG. 2 is a block diagram of a system 200 in accordance with another embodiment of this disclosure. System 200 may be the same as system 100 except that trained regressor 120 in system 200 is trained to output data set Y using a different format. In system 200, regressor 120 may be trained to receive data set X and directly produce the illumination programming data DL, e.g., an array of channel output levels, for lighting system 130 to reproduce or simulate the electromagnet event that the data acquisition system 110 measured.

Trained regressor 120 may receive input data set X from any source and is not limited to receiving data set X from a data acquisition system 110 that measures illumination. For example, trained regressor 120 may receive a data set X that includes calculated values, in place of directly measured values. In some cases, actually measuring some illumination may be impractical or time-consuming, but knowing one or more spectral power distributions of the target illumination or component illuminations, along with the spectral responsivities and other characteristics of sensor 112, a system may calculate the expected readings from the sensor 112. In such a case, the data set X may have the form or format of a data set X containing measurements from the type of data acquisition system 100 shown in FIG. 2 but with at least some measurements replaced by calculated values.

Trained regressor 120 may be a machine learning model that was trained to identify illumination from data set X. With the notation used herein, data set Y is a data set that represents the identified illumination. In the example of FIG. 1, data set Y may represent the identified illumination at a particular time as the spectral power distribution $S(\lambda)$, e.g., as a set of intensity values corresponding to a sequence of wavelength bins. In the example of FIG. 2, data set Y may represent the identified illumination at a particular time as illumination programming data DL, e.g., an array of channel drive levels for lighting system 130.

FIGS. 1 and 2 show systems in which the output of measured data X from data acquisition system 110 results in illumination programming data DL being applied to spectrally programmable lighting system 130. Additionally or alternatively, the data set X, the output data set Y of the trained regressor 120, or the illumination programming data DL may be stored for subsequent use. FIG. 1 illustrates examples in which the predicted spectral power distribution is compiled into the illumination programming data DL at different times.

Figure 3:
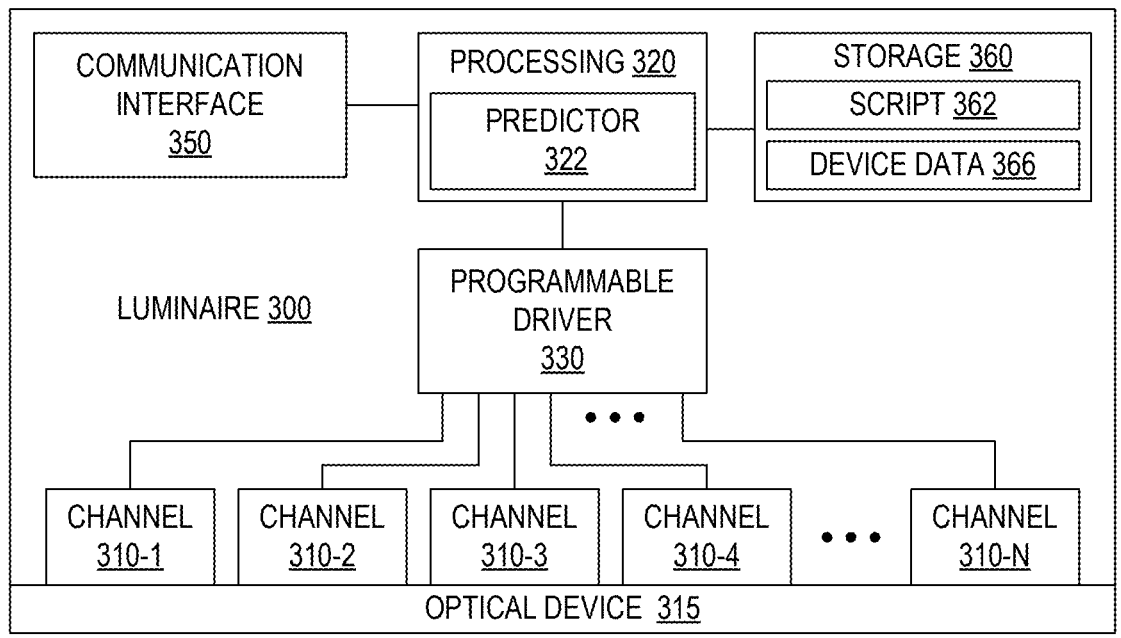
FIG. 3 is a block diagram of an embodiment of a spectrally programmable lighting system having multiple independently controllable spectral channels.

FIG. 3 shows one example of a multi-channel luminaire 300 that may be employed as a spectrally programmable lighting system such as spectrally programmable lighting system 130 of FIG. 1 or 2. Luminaire 300 is programmable to emit illumination with an intensity and a spectral power distribution that varies in a controlled manner. The term "luminaire" as used herein refers to a source of electromagnetic radiation generally and is not limited to being a source of visible light.

Luminaire 300 as shown contains multiple spectral channels 310-1 to 310-N. Spectral channels 310-1 to 310-N may emit light with different emission characteristics, e.g., different spectral power distributions and/or different degrees of collimation, polarization, or coherency. In general, spectral channels 310-1 to 310-N are not intended to be viewed directly but instead illuminate objects over time. The light from spectral channels 310-1 to 310-N may not be limited to visible light. In particular, spectral channels 310-1 to 310-N may produce electromagnetic radiation with wavelengths longer or shorter than visible light, e.g., infrared or ultraviolet light, for purposes other than human vision or for secondary human viewing effects such as fluorescence or for biological reactions other than viewing. For example, long wavelength red and NIR light may counteract negative effects that short wavelength blue light may have on mitochondria. Each spectral channel 310 may include one or more lighting elements, e.g., one or more light emitting diodes (LEDs), organic light emitting diodes (OLEDs), lasers, or other lighting elements, and different spectral channels 310 may respectively contain different types of lighting elements that have different emission characteristics, e.g., respective light emission spectra and/or degrees of collimation, polarization, or coherency. (Although FIG. 3 shows spectral channels 310-1 to 310-N as being spatially separate and separated, lighting elements associated with spectral channels 310-1 to 310-N may be mixed or interwoven across a light emitting area of luminaire 300.) The total illumination that luminaire 300 provides is generally a sum or combination of the light emitted from all of the spectral channels 310-1 to 310-N, and spectral channels 310 collectively may be configured and operated so that luminaire 300 emits a desired spectral power distribution over time.

The emission spectrum of luminaire 300 generally covers a range of wavelengths that depends on the types of lighting elements employed in spectral channels 310-1 to 310-N and may, for example, cover a range including infrared, visible, and ultraviolet wavelengths. The number N of types of spectral channels 310-1 to 310-N generally depends on the desired range and the widths of the emitted spectra of spectral channels 310-1 to 310-N. In an exemplary embodiment, spectral channels 310-1 to 310-N may have five to twenty four, on the order of one hundred, or even more different peak emission wavelengths in a range from ultraviolet to infrared. In general, a three-channel lighting system, e.g., providing red, green, and blue light channels, is only sufficient to define color and emitted intensity of light but is insufficient to provide flexibility in the spectral power distribution that luminaire 300 emits. For flexibility of the spectral power distribution, the luminaire 300 requires more than three channels for programmable illumination. The peak emission wavelengths of spectral channels 310-1 to 310-N can be separated by steps that depend on the shapes of the respective spectral power distributions of spectral channels 310-1 to 310-N. For example, direct emission LEDs having single-peak spectra with a full width at half maximum (FWHM) of about 5 to 50 nm may provide a desirable spectral resolution and cover a range of wavelengths if the emission spectra have peak wavelengths separated by steps of about 5 to 50 nm. Phosphor-converted LEDs have wider spectral power distributions, i.e., larger FWHM, so that fewer spectral channels 310 may be needed to cover the desired wavelength range if some or all of spectral channels 310 are phosphor-converted LEDs, but channels with wider spectral power distributions generally provide lower accuracy of reproduction of peaky spectra.

Luminaire 300 may employ an optical device 315 to mix the light output from channels 310 or to control the divergence or directional distribution of light output from luminaire 310. For example, optical device 315 may include a frosted plate of a transparent material to mix light from spectral channels 310-1 to 310-N and provide more spatially uniform lighting that combines light from all channels 310-1 to 310-N. Optical device 315 may use other combination methods or devices such as light guides, beam splitters, reflectors, polarized reflectors, refractors, lenses, nano diffusers or other nano-structures. In some implementations, optical device 315 may be dynamically operable to alter the divergence or directional character of light output from luminaire 300.

Illumination capabilities of luminaire 300 such as the intensity range, the spectral range, the range of available color temperatures, the gamut, the directionality, and the angular distribution of illumination from luminaire 300 generally depend on the specific choices of the number N of spectral channels 310, the types of lighting elements in spectral channels 310, the number of lighting elements of each type, and the types and arrangement of elements in optical device 315. The illumination emitted from luminaire 300 depends on those illumination capabilities and on how the illumination capabilities are controlled or programmed. In the illustrated embodiment, luminaire 300 contains a processing system 320, which may include a microprocessor or microcontroller capable of executing programs, routines, or other machine instructions to implement functions of luminaire 300. Processing system 320 may operate a programmable driver 330 to individually adjust the intensity of light emitted from each of spectral channels 310-1 to 310-N. In particular, the respective intensities emitted from spectral channels 310-1 to 310-N may be independently adjusted to provide lighting that approximates any desired spectral power distribution over the covered range of wavelengths of spectral channels 310-1 to 310-N. Programmable driver 330, for example, may dim or otherwise control the radiation emitted from each of spectral channels 310-1 to 310-N by controlling the applied electrical power, e.g., by pulse width modulation (PWM), amplitude modulation (AM), or direct digital synthesis of the drive signal waveforms applied to the lighting elements of the respective spectral channels 310-1 to 310-N over time.

Luminaire 300 may receive illumination data in the form of an illumination script 362 that represents a desired spectral power distribution of light emitted by luminaire 300 and variations over time in the desired spectral power distribution. In one embodiment, illumination script 362 represents a desired spectral power distribution, and processing system 320 may execute or otherwise use predictor 322 to determine drive levels for channels 310-1 to 310-N that optimize the luminaire output to match the desired spectral power distribution. In this embodiment, predictor 322 is trained to predict the drive levels specific to a given luminaire from the spectral power distribution.

In another embodiment, illumination script 362 contains an array of sensor readings encoding the desired illumination, such as the output of data acquisition system 110 of FIG. 1; and predictor 322 uses the array of sensor readings to determine drive levels needed to match the desired illumination. In this embodiment, predictor 322 is trained to use the array of sensor readings to predict the drive levels that are specific to the given luminaire 300.

In another embodiment, illumination script 362 comprises an array of drive levels encoding a desired illumination, such that the array of drive levels applied to a reference or standard luminaire produces a match to the desired illumination; and processing system 320 uses predictor 322 to determine luminaire-specific drive levels needed for luminaire 300 to match the desired illumination. In this embodiment, predictor 322 is trained to predict the drive levels DL specific to luminaire 300 from the array of drive levels specified for a reference or standard luminaire.

In yet another embodiment, a desired illumination is transmitted to luminaire 300 over the communication interface 350, and processing system 320 uses trained predictor 322 to determine drive levels to match the desired illumination. The desired illumination may be transmitted to luminaire 300 in the form of spectral power distribution, sensor readings encoding the desired illumination (such as the output of data acquisition system 110 of FIG. 1), drive levels producing the desired illumination when applied to a reference or standard luminaire.

In yet another embodiment, a desired illumination may be represented by its coordinates in a 3D color space and may be transmitted to luminaire 300 over the interface 350 or saved in an illumination script 362. Three parameters, e.g. two chromaticity coordinates and the luminous or radiant output level, or tristimulus values, or the coordinates in any 3D color space, are insufficient for determination of the desired illumination by a spectrally programmable lighting system having more than three spectral channels. However, this representation may be adequate under the regularizing assumption that the desired illumination belongs to a given class. For example, the desired illumination may be defined to be the best approximation of the Planckian distribution with the provided fixed coordinates in a 3D color space.

Illumination script 362 may be stored in a memory or storage 360 or may be available as needed from an external source, e.g., from local network storage or from cloud storage or a service, accessible through a communication interface 350. In an exemplary embodiment, communication interface 350 connects luminaire 300 to a network that may include similar luminaires or control devices, e.g., a light player, and can further be part of a user interface that allows a user to control luminaire 300, for example, to select lighting for a lighting system including luminaire 300. Storage system 360 may be any type of system capable of storing information that processing system 320 can access.

Illumination script 362 could have a variety of different formats suitable for representing the desired lighting. In one implementation, illumination script 362 represents illumination using one or more "illumination frames" or one or more sequences of illumination frames, where each illumination frame corresponds to a time period and includes a representation of a spectral power distribution desired for this time period. The illumination data may be partitioned into "tracks" corresponding to different luminaires or different sets of luminaires in a multi-luminaire system. Tracks may also include commands or information for audio, video, games, simulations, HVAC, window shades, electrochromic windows, humidifiers, air purifiers, or other environmental systems.

Device data 366 may indicate the characteristics of luminaire 300. Such characteristics of luminaire 300 may include, for example, an identifier for luminaire 300, a maximum or nominal frame rate of luminaire 300, the number N of spectral channels 310 in luminaire 300, data indicating the respective spectral power distributions of light emitted from spectral channels 310, maximum intensities from the respective channels 310, and the response of each channel 310 to current, temperature, or other operating parameters of luminaire 300, and information indicating the position or orientation of luminaire 300 relative to other light sources or to a reference point for an illumination system incorporating luminaire 300. Device data 366 may further include machine instruction for one or more models for predictor 322, e.g., a trained model for predicting drive levels required for matching a desired spectral power distribution, or a trained model for predicting drive levels from the drive levels required for matching a desired spectral power distribution by the reference or standard luminaire. Device data 366 may be used internally in luminaire 300, e.g., by processing system 320 when controlling programmable driver 330, or externally, e.g., when luminaire 300 communicates capabilities within a multi-component illumination system incorporating luminaire 300.

Luminaire 300 may be programmed to produce illumination that approximates a spectral power distribution that is within the covered wavelength range and the intensity and resolution limits of spectral channels 310-1 to 310-N. Luminaire 300 may further be used in an illumination system with other light sources that are spatially distributed, which may facilitate production of desired spatial or directional patterns in illumination. Each of the characteristics of the illumination may be constant over time or may be subject to temporal variations. Illumination systems may play such illumination content at faster or slower speeds and may match or synchronize illumination with presentations, e.g., with audio, video, games, simulations, or any other presentation or user activity.

Luminaire 300 by itself may constitute a spectrally programmable lighting system such as spectrally programmable lighting system 130 of FIG. 1. However, a spectrally programmable lighting system may include one or more spectrally programmable light sources or luminaires such as luminaire 300 and other types of light sources that individually may not be spectrally programmable.

Figure 4:
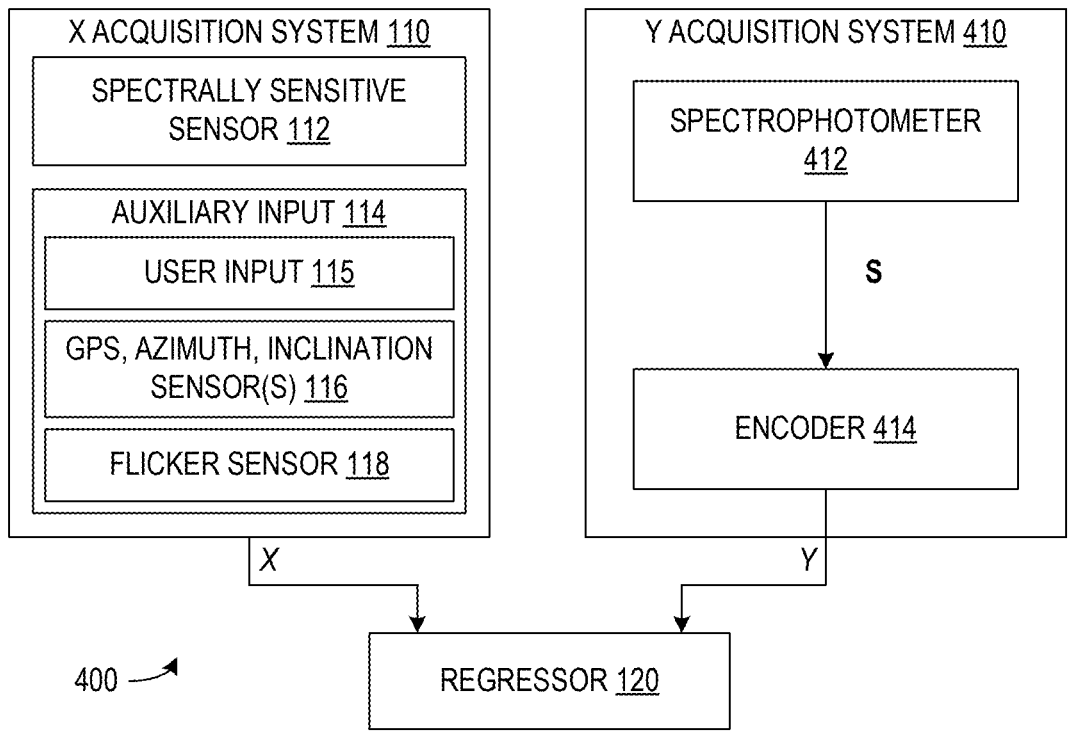
FIG. 4 is a block diagram of a system for training a machine learning model in accordance with an embodiment of the present disclosure.

FIG. 4 is a block diagram of a system 400 for training a regressor 120, which may subsequently be used in system 100 or 200 of FIG. 1 or 2. Regressor 120 implements a machine learning model to calculate illumination programming data such as the drive levels for the channels of luminaire 300. In one embodiment, regressor 120 is a random forest regressor. Regressor 120 may be trained on many input training arrays X and output training arrays Y. Each input training array X has a corresponding output array Y based on the same illumination or electromagnetic event.

An X data acquisition system 110, which may be similar or identical to, e.g., of the same type as, the data acquisition system 110 in FIG. 1 and FIG. 2, may be used to acquire the input training array X, e.g., for illumination measurements used in the input training array X, and a Y acquisition system 410 may be used to acquire the output training array Y, e.g., for illumination measurements used in the output training array Y. For example, each output training array Y may contain measurements acquired using a spectrometer, spectrophotometer, or other sensor system 412 to measure the spectral distribution S of illumination corresponding to the input training array X, and an encoder 414 may encode or format the output training array Y that represents the illumination. In one embodiment, an encoder 414 in Y measurement system 410 is an identity encoder, and the output training array Y may be a representation of the spectral power distribution S corresponding to the training array X. The spectral power distribution S may be a fixed spectral power distribution $S(\lambda)$ or a time dependent spectral power distribution $S(\lambda, t)$. Input training array X or output training array Y may include calculated values corresponding to measurements that a system of the same type as X data acquisition system 110 or the same type as Y data acquisition system 410 would measure. As described above, some illuminations may be impractical to measure using system 110 or 410, but knowing the spectral power distributions of these illuminations, and spectral responsivities and other characteristics of sensor 112 or 412, one may be able to calculate the expected readings by a data acquisition system 110 or 410, and uses them to form input training array X or output training array Y. In one example, the output training array Y may be a high spectral resolution representation of the target illumination or electromagnetic event, and the input training array X may be calculated from the output training array Y and characteristics of sensors 112 and 114 of a data acquisition system 110 of the type illustrated in FIG. 4. Howsoever the input training arrays X and the corresponding output training arrays Y are obtained, regressor 120 may be trained to predict a representation Y of a spectral power distribution S from an input array X.

In one embodiment, spectrally programmable lighting system 130 may be dedicated to simulating natural light, and the training data set for regressor 120 may include many daylight spectra measured by a portable spectrometer under different atmospheric conditions, in different parts of the world, during different times of the day, at different altitudes, and different inclination, azimuth, and acceptance aperture.

Such measurements may constitute all or part of each output training array Y. Measurement system X may be a consumer-grade multi-channel light sensor; since many such systems may be manufactured and offered commercially by various suppliers, each type of X acquisition system 110 may not be physically present to measure the daylight spectra when the Y acquisition system 410 measures the daylight spectra. For each spectral power distribution corresponding to the output training arrays Y, the input training arrays X for each type of consumer-grade X acquisition system 110 may instead be calculated using known spectral characteristics of the various types of X acquisition system 110 and the output training array Y. This method may include characterizing a type of X acquisition system 110, using an output training array Y to calculate an input training array X for that type of X acquisition system 110, and using the calculated input training array X when training the machine learning model embodied by regressor 120 for that type of X acquisition system 110. The data in the output training array Y may be stored as a standard training dataset for model training specific to different types of X acquisition systems 110 that may be built in the future.

In another embodiment, encoder 414 in Y measurement system 410 calculates drive levels that produce illumination spectrum $S(\lambda)$ when applied to a lighting system, e.g., a luminaire similar to luminaire 300, and the output training array Y is equal to the array of drive levels. Regressor 120 may thereby be trained to predict the array Y representing luminaire drive levels, from an input array X determined using measurement system 110.

Another aspect of the present disclosure is efficient distribution of illumination programming or data to a scalable network of luminaires in a spectrally programmable lighting system. In particular, a control system for a network of luminaires may distribute one or more relatively simple data sets to the luminaires, and each luminaire may employ a machine learning processes using the received data set to determine illumination programming or data that is specific to the luminaire. In one example, the control system for a network containing multiple luminaires may broadcast the same illumination programming or data set to many or all luminaires, and each luminaire may employ a machine learning model that is trained for that specific luminaire to generate control data, e.g., drive levels, for the luminaire. Such a system or a process may reduce the data processing required in the control system without unduly burdening control systems of the luminaires. The response time of the illumination system may thus be improved.

Figure 5:
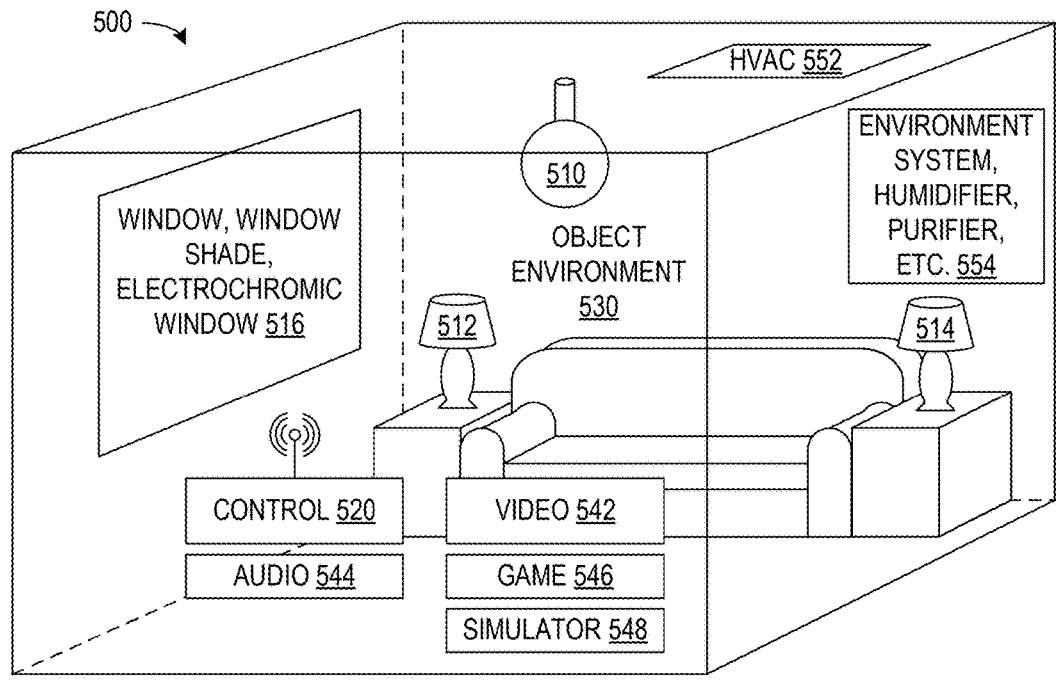
FIG. 5 illustrates an environment including a spectrally programmable lighting system including a network of light sources.

FIG. 5 shows an embodiment of a spectrally programmable lighting system 500 including multiple light sources 510, 512, 514, and 516 and a control system 520. Light sources 510, 512, 514, and 516 may be a combination of different types of light sources that may be arranged in a manner that is unique to illumination system 500. In one implementation, one or more light sources 510, 512, 514, and 516 may be programmable for cooperative operation under the control of control system 520, and one or more of light sources 510, 512, 514, and 516 may not be programmable or otherwise under the control of control system 520. For example, one or more light source 510 may be a multi-channel, programmable luminaire, e.g., luminaire 300 of FIG. 3, capable of reproducing a desired spectral power distribution and may have an interface for communications with control system 520 or other light sources. As another example, a window system 516 may include a controllable window shade or an electrochromic window system that may be programmable to change intensity or spectral characteristics of light that the window system 516 provides to environment 530. Another light source 512, 514, or 516 may have only limited electronic control of illumination characteristics. For example, some light sources 512 or 514 may have a controllable intensity or have time of day awareness, with no spectral control, e.g., a programmable window shade or a fixed spectrum lamp with an network controlled dimmer, and other light sources 516 may produce light over which control system 520 has little or no control, e.g., a window without electronic shades or spectral filtering, but control system 520 may be able to measure characteristics of illumination from uncontrolled light sources and adapt the controllable light sources to compensate. U.S. Pat. No. 9,974,141, entitled "Lighting System with Sensor Feedback," further describes systems with sensor feedback and is hereby incorporated by reference in its entirety. Some examples from a large variety of exemplary luminaires 510, 512, 514, and 516 include upper/lower wall luminaires, torchiere/projector luminaires to up-light ceilings or highlight objects, and desk/table lamps. A regularly spaced grid such as ceiling array of luminaires or a flat/thin wall luminaires that resemble windows could be employed in illumination system 500 in combination with other types of luminaires.

Control system 520 in illumination system 500 coordinates the light emissions from luminaires in order to produce the desired illumination of the object environment 530. In particular, control system 520 may be set to provide illumination according to a user's selection or intended activity in object environment 530. In general, control system 520 may be a separate device, e.g., special purpose hardware or a computing system executing light player program, or may be implemented within one or more of luminaires 510, 512, 514, or 516 in illumination system 500. Control system 520 may communicate with luminaires 510, 512, 514, or 516 over a local network, e.g., a Wi-Fi network.

Control system 520 may control or be coordinated with other systems in addition to systems for lighting for environment 530. For example, control system 520 may control a video system 542, an audio system 544, a game system 546, or a simulator system 548, so that illumination and entertainment in environment 530 may complement each other. In another example, control system 520 may control or be coordinated with a heating, ventilation, or air conditioning (HVAC) system 552 or other environmental systems 554 such as an air humidifier or air purifier. Environment 530 may thus provide illumination that is coordinated with entertainment or environmental conditions.

In accordance with another aspect of the present disclosure, methods and hardware may efficiently distribute illumination data to a network of luminaires, while keeping the computing time and power required for compilation of the illumination data into drive levels consumable by a luminaire driver short and independent of the number of luminaires on the network.

Figure 6:
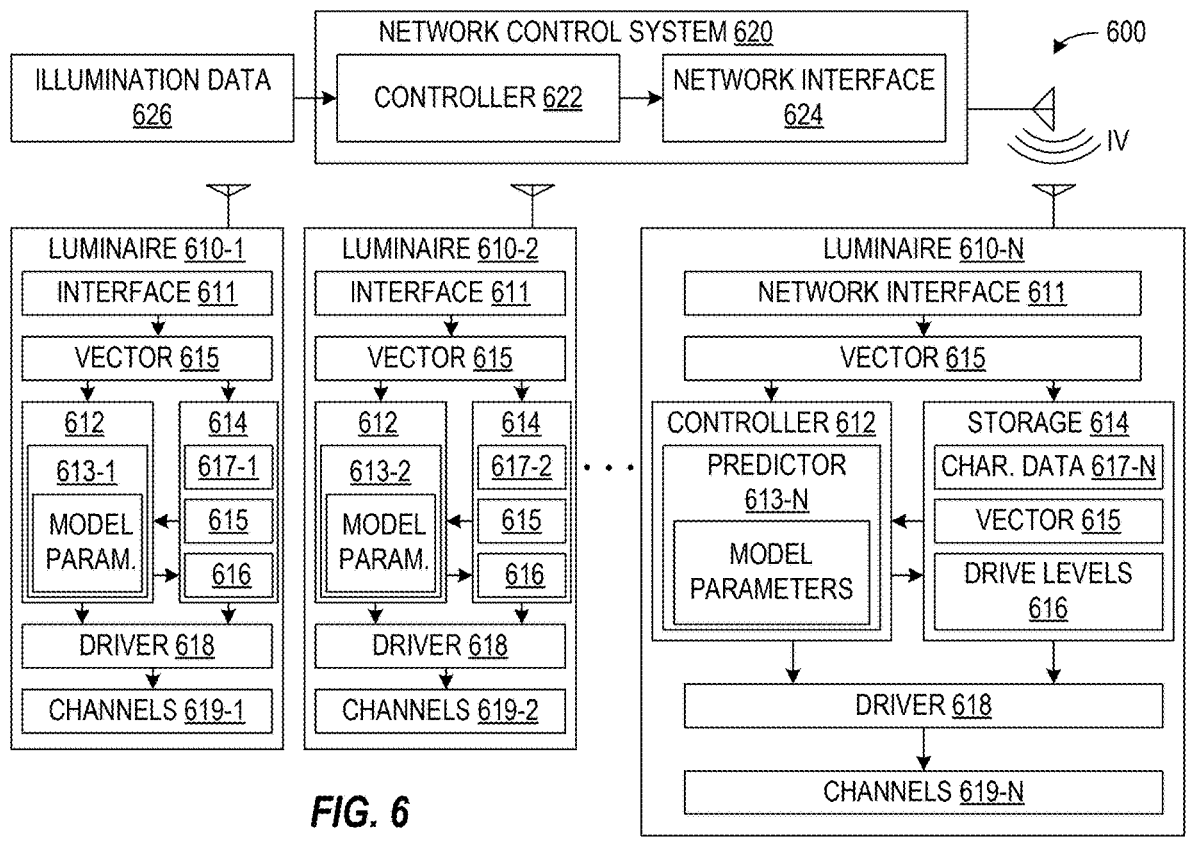
FIG. 6 is a block diagram of a spectrally programmable lighting system in accordance with an embodiment including multiple spectrally programmable luminaires.

FIG. 6 is a block diagram of a spectrally programmable lighting system 600 that includes a network of N spectrally programmable luminaires 610-1 to 610-N and a network control system 620. Spectrally programmable luminaires 610-1 to 610-N are sometimes generically referred to herein as luminaires 610.

In the embodiment of FIG. 6, each luminaire 610 includes a network interface 611, a luminaire controller 612, memory or storage 614, and a programmable driver 618 that controls the respective light intensities emitted from spectral channels 619, i.e., controls the specific spectral channel set 619-1 to 619-N in that luminaire 610. Network interface 611 may implement a network protocol, e.g., Wi-Fi, Bluetooth, or another wireless or wired communication protocol, for communications with other luminaires 610 or network control system 620. As described further below, network interface 611 may receive an illumination vector 615 that the network control system may have broadcast to multiple luminaires, and illumination vector 615 may be stored in storage 614 or used by controller 612. Luminaire controller 612 may be a microcontroller or microprocessor capable of executing software or firmware applications, programs, or routines during operation of the luminaire 610. Each of luminaires 610-1 to 610-N may particularly execute an associated one of machine learning model based predictors 613-1 to 613-N, sometime generically referred to herein as predictors 613. Predictors 613-1 to 613-N provide illumination programming or data, e.g., drive levels 616, that are specific to their respective programmable driver 618 and the respective spectral channels 619-1 to 619-N of luminaires 610-1 to 610-N. Storage 614 may include memory used to implement a file system that may store illumination programming or data sets, e.g., an illumination vector 615 that indicates illumination characteristics, received through the network. Storage 614 may also store illumination programming or data sets, e.g., drive levels 616, that are specific to or customized for the programmable driver 618 and the spectral channels 619 of the luminaire 610. Programmable driver 618 may drive spectral channels 619 at drive levels 616 to produce illumination, e.g., illumination having illumination characteristics indicated by illumination vector 615.

Network control system 620 may be an illumination player, e.g., control system 520 of FIG. 5, or another processing system that includes components such as a processor or controller 622 and a network interface 624. More generally, network control system 620 may include additional computer components such as volatile memory, non-volatile memory, storage devices, device buses, and IO devices, e.g., a display, a touchscreen, a keyboard, a mouse, and a wide area network adaptor or interface, which are not shown in FIG. 6. Network interface 624 implements a communication protocol, e.g., Wi-Fi, Bluetooth, or another wireless or wired communication protocol, that allows network control system 620 to communicate with luminaires 610-1 to 610-N. Network interface 624 may include a network adaptor that is used solely for communications with luminaires 610 or that is also used for other communication such as communication over the Internet or with a local source of illumination data or scripts. FIG. 6 only shows the components 622 and 624 for ease of illustration and to avoid obscuring the particularly relevant features of network control system 620.

Controller 622 in network control system 620 may include a microprocessor that executes software or firmware. Controller 622 may control network interface 624 to provide illumination data to luminaires 610, and thereby control illumination of the environment containing luminaires 610. In particular, controller 622 may receive illumination data 626 from a source not shown in FIG. 6, may adapt the illumination data to construct one or more illumination vectors 615 that indicate illumination characteristics, and transmit the illumination vectors 615 to luminaires 610.

Illumination data 626 may be an "illumination script" or a "lumenscript". A lumenscript in this context is a data structure representing a timed sequence of vectors of illumination characteristics, each illumination vector indicating a desired spectral power distribution. Alternatively, a lumenscript may be a data structure representing a timed sequence of sensor measurement arrays, identical or similar to the output of the data acquisition system 100, where each array represents or encodes one or more desired spectral power distributions. Alternatively, a lumenscript may be a data structure representing a timed sequence of drive vectors, where each drive vector, when applied to a standard or reference luminaire, produces a match to a desired spectral power distribution.

The terms "illumination script" or a "lumenscript" as used herein do not imply that the spectral content of the desired illumination is limited to visible part of the spectrum. A lumenscript may be a file containing a set of instructions in accordance with a syntax defined for lumenscripts, and the lumenscript may identify illumination to be played or produced in an illuminated environment U.S. Pat. No. 8,922,570, entitled "Luminaire System," which is hereby incorporated by reference in its entirety, discloses examples of luminaires that employ illumination scripts and further discloses syntax and structure of illumination scripts.

Luminaires 610-1 to 610-N on the network are not necessarily similar. The emission spectra of component LEDs in channels 619 may differ; and different luminaires 610 may also have different numbers of channels 619. As a result, different luminaires 610-1 to 610-N may have different predictors 613-1 to 613-N that match a given a given vector 615 of illumination characteristics to different drive level arrays 616.

In accordance with an aspect of the present disclosure, luminaire characterization, which may be determined during manufacture of each of luminaires 610-1 to 610-N, may include creating and training respective luminaire machine learning models, e.g., respective predictors 613-1 to 613-N, capable of translating illumination data, e.g., a vector 615, into corresponding drive levels 616-1 to 616-N for channels 619-1 to 619-N in accordance with respective luminaire characterization data 617-1 to 617-N for the luminaire 610-1 to 610-N. The luminaire machine learning model parameters may be stored in storage 614 on luminaire 610, for predicting output drive level arrays from incoming illumination data. This approach may be scaled to any number of luminaires 610 since individual luminaires 610 can perform luminaire-specific calculations of the illumination data that the network control system 620 transmits or broadcasts to any number of luminaires 610. Accordingly, network control system 620 is not overwhelmed or slowed because network control system 620 does not need to perform calculations for all of the luminaires 610 of the programmable lighting system 600.

Figure 7:
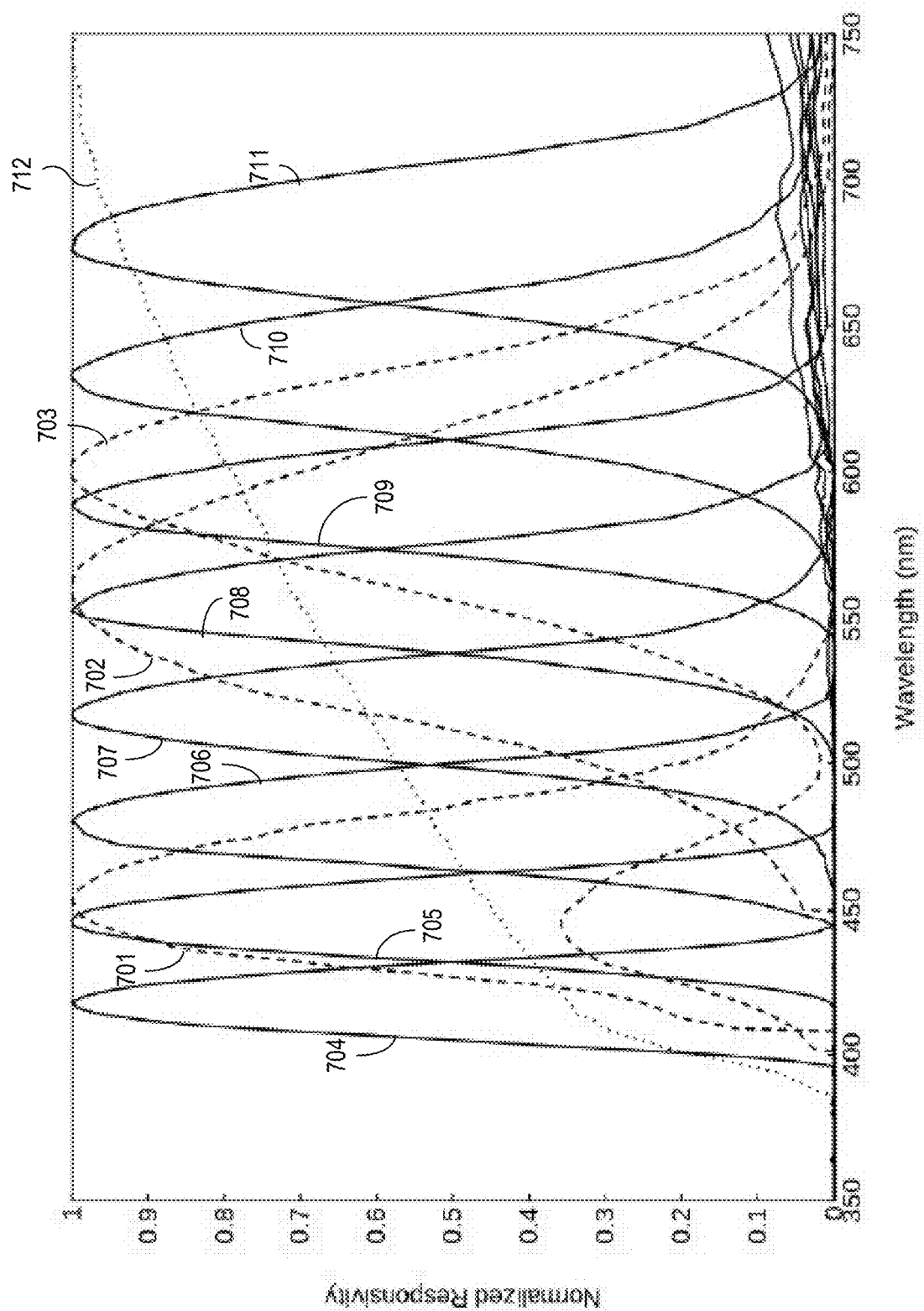
FIG. 7 is a plot showing spectral responsivities of an exemplary spectrally sensitive sensor.

In one specific example, each predictor 613 may predict the drive levels 616 on the basis of a trained random forest regressor model. Each vector 615 may be a 12-component vector having components corresponding to readings of a spectral power distribution by a 12-channel spectrally sensitive sensor. The responsivity curves 701 to 712 of an exemplary 12-channel sensor are shown in FIG. 7. Curves 701 to 712 particularly correspond to a combination of responsivity data for the commercially available AMS sensor arrays AS7341 and TCS3530. The exemplary 12-channel sensor as illustrated in FIG. 7 includes three sensors filtered to approximate responsivities 701 to 703 of the human eye shown by dashed curves 701 to 703, eight narrow-band filtered sensors with spectral responsivities 704 to 711 shown by solid curves, and one unfiltered sensor with spectral responsivity 712 shown by the dotted curve. Just using a 12-channel sensor, a vector of illumination characteristics corresponding to a measured and recorded spectral power distribution may include twelve readings respectively from the twelve sensor channels. For luminaire-specific training of predictor 613, a set of vectors of sensor readings (input) and a set of corresponding drive levels (output) may be partitioned into a training subset (for example, 75% of the vectors) and a test subset (for example, 25% of the vectors). The training subset may be used to train the model, and the test vectors may be used to test how well predictions from the trained model match the corresponding recorded/target illumination. The luminaire drive levels may be calculated by taking a measured spectral power distribution corresponding to each vector of sensor readings and solving an error minimization problem using a palette match optimizer. U.S. Pat. No. 9,635,728, entitled "Method of Light Spectrum Replication," and U.S. Pat. No. 10,433,392 entitled "Lighting Having Spectral Content Synchronized with Video," which are hereby incorporated by reference in their entirety, further describe methods that use the appearance of a palette of objects to measure and minimize perceivable differences between target/recorded illumination and illumination that a luminaire produces.

Alternatively, an optimizer may minimize the RMS difference between the target/recorded spectral power distribution and the illumination from the luminaire. Additionally or alternatively, the optimizer may constrain the luminous flux, chromaticity, radiant power, correlated color temperature, or another metric of the luminaire spectrum to be equal or similar to the corresponding metric of the target/recorded spectrum.

Figure 8:
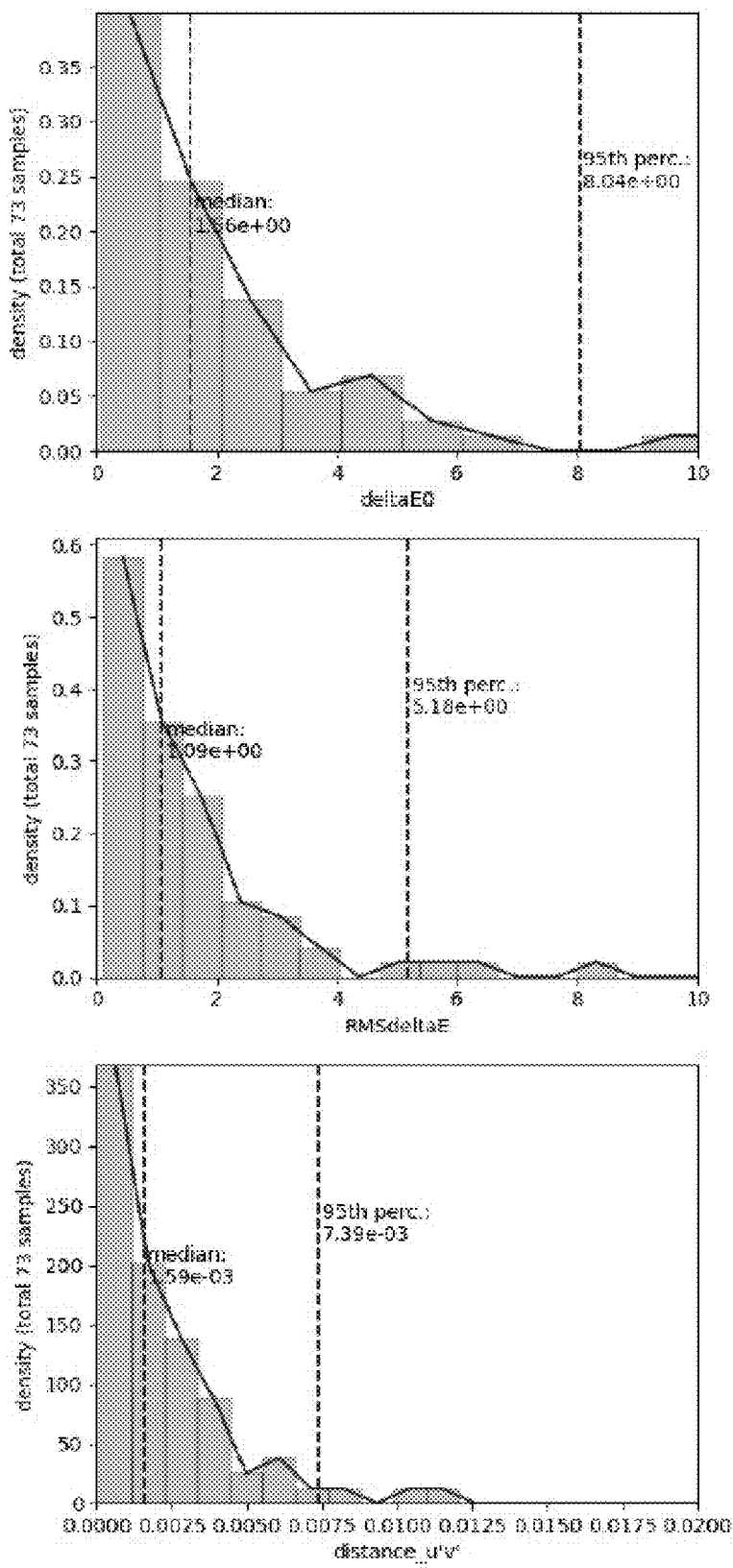
FIG. 8 shows histograms of prediction errors of an exemplary machine learning model in accordance with an embodiment of the present disclosure.

Histograms of prediction errors for a test set (out of a sample) are shown in FIG. 8 to illustrate the quality of predictions. The sizes of the training and test subsets in this example were 221 samples and 73 samples, correspondingly. The errors characterize the inaccuracy of prediction by comparing a metric of the luminaire spectrum predicted from the 12-channel sensor readings with the same metric of the corresponding actual (measured and recorded) spectrum, e.g., measured with a precision spectrometer. In FIG. 8, "delta E0" metric is the distance between the actual and predicted spectra in CIE L*a*b* color space; "RMS delta E" metric is the RMS distance between coordinates of the actual and predicted luminaire spectra reflected by color samples of a reference palette; and "distance u'v'" is the distance between the actual and predicted spectra in CIE u'v' color space. For the prediction to be considered acceptable, the delta E0 metric should not be much larger than 1.0, which is taken as a just-noticeable difference (JND).

Each of the modules and systems described above may include, for example, hardware devices including electronic circuitry for implementing the functionality described herein. In addition or as an alternative, each module or system may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A method, comprising:
acquiring respective first representations of a plurality of training illuminations;
acquiring respective second representations of the training illuminations, the second representations differing from the first representations;
training a machine learning model using the first representations and the second representations of the training illuminations; and
operating a processing system to execute the trained machine learning model to predict a second representation of an illumination from a first representation of the illumination.

2. The method of claim 1, wherein at least one of acquiring the first representations of the training illuminations and acquiring the second representations of the training illuminations comprises measuring the training illuminations.

3. The method of claim 1, wherein at least one of acquiring the first representations of the training illuminations and acquiring the second representations of the training illuminations comprises using characteristics of sensors in a first type of system associated with the first representations or a second type of system associated with the second representations to calculate values used in the first representations or the second representations.

4. The method of claim 1, wherein:
each of the first representations contain data corresponding to measurements acquired using first light sensors in a first type of system; and
each of the second representations contain data corresponding to measurements acquired using second light sensors in a second type of system, the second light sensors having differing wavelength-dependent responsivities.

5. The method of claim 4, wherein the first type of system further comprises a sensor configured to measure temporal light modulation.

6. The method of claim 4, wherein the first light sensors comprise sensors having responsivities approximating spectral responsivities of a human eye.

7. The method of claim 4, wherein the first type of system measures light intensities at a first plurality of spectral channels.

8. The method of claim 7, wherein the second type of system measures light intensities at a second plurality of spectral channels, and the first type of system measures light intensities in fewer spectral channels than does the second type of system.

9. The method of claim 7, wherein the first type of system comprises a camera.

10. The method of claim 1, wherein the second representation comprises a plurality of drive levels that cause a programmable light source to reproduce the illumination.

11. The method of claim 1, wherein the training illuminations comprise one or more of natural daylight, light from an incandescent source, light from a high intensity discharge source, light from a fluorescent broadband source, light from a fluorescent narrowband source, light from a phosphor-converted light emitting diode (LED), and light from a multi-channel LED source.

12. The method of claim 1, wherein the machine learning model comprises random forests.

13. The method of claim 1, wherein the second representations are higher resolution representations of the training illuminations than the first representations.

\* \* \* \* \*